…

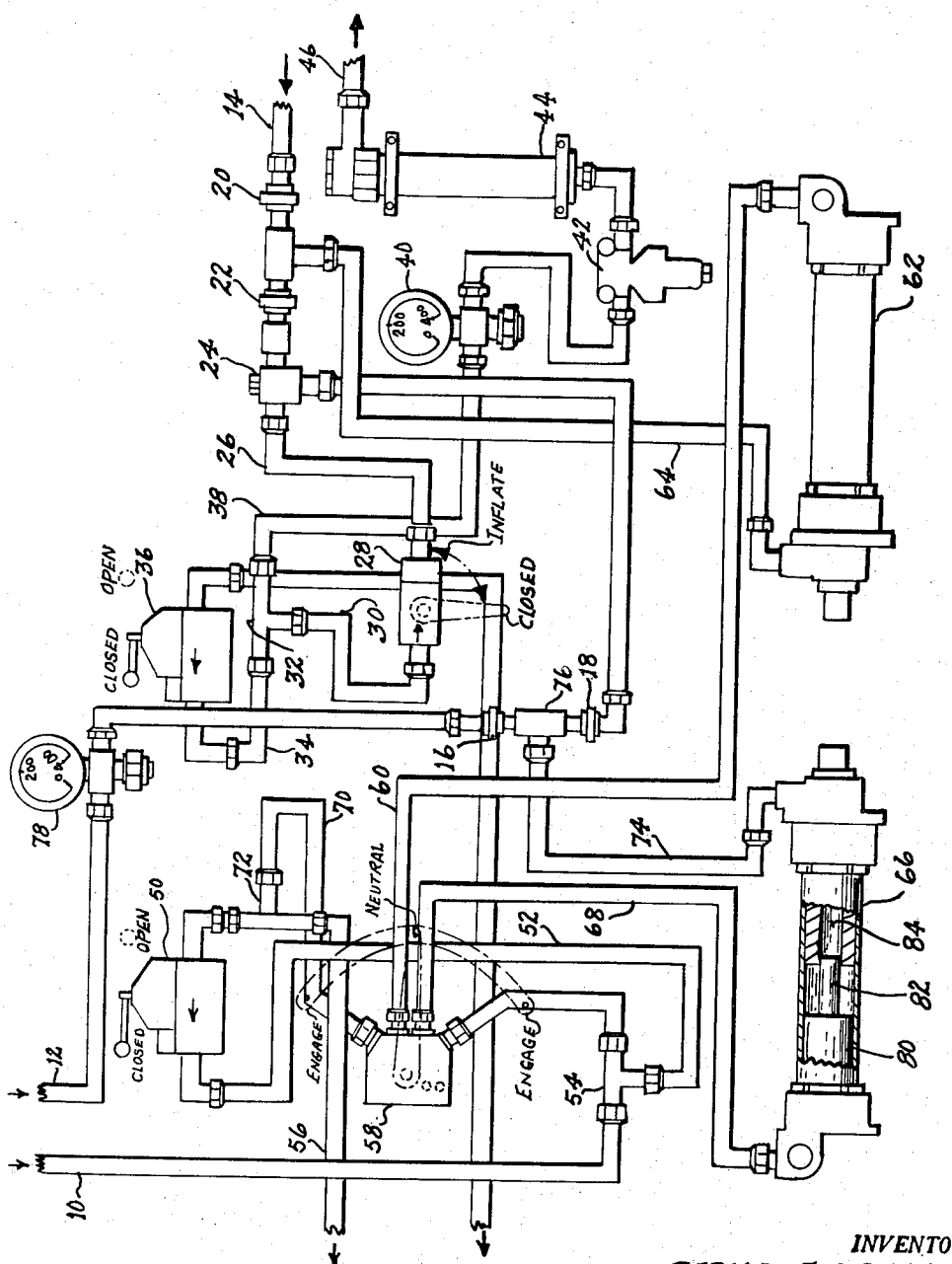

United States Patent Office 3,357,450
Patented Dec. 12, 1967

3,357,450
POSITIVE CONTROL TIRE INFLATION SYSTEM
Gerald F. Spillman, Denver, Colo. (14418 Avis, Lawndale, Calif. 90260)
Filed Feb. 16, 1965, Ser. No. 433,236
2 Claims. (Cl. 137—567)

ABSTRACT OF THE DISCLOSURE

A positive control pneumatic system having a pair of pressure intensifying cylinders controlled by a manually operated valve with a valve provided for controlling the airflow from a low pressure source, and a valve for reducing the system pressure and venting the system to the atmosphere.

---

The invention described herein may be manufactured and used by or for the United States Government for governmental purposes without payment to me of any royalty thereon.

This invention relates generally to inflating tires, and more specifically to a system for safely inflating and deflating high pressure tires such as those used on high performance aircraft.

Until recently problems concerning the inflation of aircraft tires had been relatively insignificant, mainly because of the low pressures involved. Presently with pressures in excess of 300 lbs. per sq. in. as required by some aircraft, the danger in inflating these tires is greatly increased.

The danger stems from three causes: first, a tire may explode merely from a manufacturing defect when it reaches its inflation pressure; secondly, the rim may give way due to metal fatigue or abuse, and thirdly, over-inflation of a low pressure tire will cause it to explode. To prevent serious injury to personnel, high pressure tires are required to be inflated very slowly in a steel cage, especially as they approach the maximum pressure. This, of course, requires a large amount of duplicate equipment to prevent costly delays and aircraft down time.

A regulator may be provided to prevent over-inflation of low pressure tires, but nothing will prevent a manufacturing defect from destroying the tire or metal fatigue from causing the rim to give way.

It is the primary object of this invention, therefore, to provide a method and means of inflating and deflating high pressure tires in a safe and controlled manner.

These and other advantages, features and objects of the invention will become more apparent from the following description taken in connection with the illustrative embodiment in the accompanying drawing wherein the figure is a flow diagram illustrating the system of this invention.

Experience has shown that prior to a tire destroying itself because of the air pressure it contains, the tire will generally manifest some outward deformation such as a bubble or bump on the outside of the tire. Likewise, experience has shown that a rim will generally show definite signs of stress and perhaps give off audible sounds prior to giving way.

Because of these indicators, it has been found that by inflating a tire in small increments, it is possible to inspect the tire between each increment to determine if there will be a failure of any parts. The inspection would be carried on, of course, with the tire and rim enclosed in the protective cage.

In addition to the safety feature involved with my invention, I have found that this apparatus likewise avoids the necessity of procuring, at large expense, new air compressors to obtain the higher air pressures. For example, where a conventional tire inflation system is capable of producing up to 190 p.s.i., the system described herein will act as a booster and increase the pressure to well over 300 p.s.i.

Referring now to the figure, the system receives its working air pressure from conventional means (not shown) through the air lines 10, 12 and 14; the pressure may be in the order of 190 p.s.i. although not expressly limited thereto. A gauge 78 on the inlet line 12 is utilized to measure the air compressor pressure during system operation.

If a tire is to be inflated to less than 190 p.s.i., it is unnecessary to use the extra high pressure pump. The pressurized air from lines 12 and 14 pass through check valves 16 and 18, and 20 and 22, respectively, and onto the T 24 where the lines are joined and the pressurized air leaves through line 26 to valve 28. The valve 28, when set at the inflate position, permits the air to pass through line 30 to the T 32. Here the air will go in two directions; it will pass through air line 34 to valve 36 which under this condition will be closed. The air will also proceed through line 38 past the pressure indicator 40 to the filter 42 where the air is filtered and thusly onto the chemical dryer 44 and out line 46 which is attached to the tire valve stem.

To measure the air pressure in the tire, it is necessary merely to close the valve 28 which closes off the incoming air and leaves only the pressure from the line 46, attached to the tire, on that part of the system which is indicated by the gauge 40. (During inflation or deflation the pressure on gauge will be the differential between the tire being inflated and the air compressor air pressure.)

When a defect is found in the tire or rim, it is necessary to deflate the tire as rapidly as possible. With a conventional system the only safe method of deflating the tire is by puncturing it, or alternatively by the precarious method of removing the valve stem of the tire.

The instant invention provides a safe rapid means of deflating the tire whereby personnel may be from 10 to 100 ft. from the tire. By closing the valve 28, inflation will immediately cease. The opening of valve 36 permits air to return through the lines 46 and 38 to the T 32 and thence through line 34 to valve 36 and along line 48 where the air is vented to the atmosphere at some distant location (e.g. outside of the building). The tire pressure may be measured at any time on gauge 40 by merely closing valve 36.

If reinflation is desired, it is necessary to merely close valve 36 and open valve 28.

Occasions may arise during the course of tire inflation (under 190 p.s.i.) when the pressure in the tire is close to, but less than, the air compressor cut off pressure and still above the air compressor turn on pressure.

In this situation it is necessary to reduce the pressure in the air compressor system to cause it to operate. By opening the valve 50 air will follow the line 52 attached to the T 54 and pass to the atmosphere by means of line 56. When the air compressor begins to operate, the valve 50 is closed and pressure in the system will be built up to the air compressor cut off point. No air will be lost from the tire because of the check valves in the system.

If a tire of the high pressure type (in excess of 190 p.s.i.) is to be inflated, the system will operate as hereinbefore described until the tire is filled to the maximum pressure capable of being developed by the conventional air compressor. The boost system will then be used to obtain the additional pressure needed.

The valve 58, normally left in the neutral position, is moved to the engage position to activate the boost system. Movement to the upper, engage position will force compressed air at 190 p.s.i. through the line 60 to the actuating cylinder 62. The actuating cylinder which provides a mechanical advantage by utilizing a large and small piston, as shown in the cut away view of cylinder 66, forces high pressure air through the line 64 and past check valve 22 into the conventional system.

The valve handle is then manually moved to the opposite engage position, at which time air from the line 14 passes check valve 20 and causes the air in line 64 to reverse direction and force the actuating cylinder to its original position. Likewise, the air in line 60 reverses its direction and is vented to the atmosphere through valve 58, line 70, T 72 and line 56. The system is identical for both actuating cylinders. The air from valve 58 enters the cylinder 66 through line 68. The high pressure is forced out line 74 to T 74 and into the conventional system. Air from line 12, passing check valve 14, will cause the cylinder to return to its original position, the air venting through line 68, valve 58, line 70 to T 72 and line 54.

The pressure rise as seen on air gauge 40 after each operation of the valve 58 may be from 5 to 50 p.s.i. depending on the size of the actuating cylinders, and the tire being inflated.

As described, this system permits safe, rapid inflation and deflation of pressurized vessels. For example, with this system it is possible to inflate a large aircraft tire from 20 to 210 p.s.i., deflate the tire and reinflate the same tire in less than 10 minutes. A conventional apparatus may take as long as one hour to perform the same operation.

By manually operating the boost system it is possible to inspect the tire after each increment of air is forced into the tire, and rapidly deflate the tire in case of a malfunction of tire or rim.

Although the invention has been described with reference to a particular embodiment, it will be understood to those skilled in the art that the invention is capable of a variety of alternative embodiments within the spirit and scope of the appended claims.

I claim:
1. An apparatus for safely inflating and deflating a high pressure device comprising;
   a first working air pressure system having an input for supplying low pressure air to the device, first valve means having a closed position causing the device to become isolated from the system input and an open position connecting the device to the system input, second valve means for selectively venting the system and device to atmospheric pressure,
   a boost system having a plurality of differential area piston and cylinder means each of which has a larger area portion connected to a pressure input and a smaller area portion connected to the first system, third valve means comprising a manually operated valve having a neutral position and a position to connect said last mentioned input to the larger area portion of each of the plurality of cylinder means whereby the pressure in the first system is increased one predetermined increment of pressure each time the third valve means is opened to one of the actuating positions.

2. The apparatus of claim 1 further including fourth valve means for selectively venting the boost system to atmospheric pressure.

References Cited

UNITED STATES PATENTS

| | | | |
|---|---|---|---|
| 2,067,358 | 1/1937 | Thornton | 230—52 |
| 2,340,929 | 2/1944 | Cadbury | 230—52 |
| 2,539,292 | 1/1951 | Anderson | 230—52 |
| 2,977,040 | 3/1961 | Dulebohn | 230—52 |

M. CARY NELSON, *Primary Examiner.*

W. CLINE, *Assistant Examiner.*